(12) United States Patent
Fuchs et al.

(10) Patent No.: US 8,672,384 B2
(45) Date of Patent: Mar. 18, 2014

(54) MOTOR VEHICLE HAVING A CHASSIS FRAME AND A VEHICLE BODY (71) Applicant: Bayerische Motoren Werke Aktiengesellschaft, Munich (DE)

(72) Inventors: Horst-Arno Fuchs, Starnberg (DE); Josef Forster, Ingolstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/687,661

(22) Filed: Nov. 28, 2012

(65) Prior Publication Data

US 2013/0076069 A1 Mar. 28, 2013

Related U.S. Application Data

(63) Continuation of application No. PCT/EP2011/060004, filed on Jun. 16, 2011.

(30) Foreign Application Priority Data

Jun. 21, 2010 (DE) .......................... 10 2010 030 295

(51) Int. Cl.
 *B62D 24/00* (2006.01)
(52) U.S. Cl.
 USPC .......................................... 296/35.1; 156/291
(58) Field of Classification Search
 USPC ............................ 296/35.1, 901; 156/92, 291
 See application file for complete search history.

(56) References Cited

U.S. PATENT DOCUMENTS

| 5,964,490 A | 10/1999 | Schroeder et al. |
| 7,287,797 B1 * | 10/2007 | Belloso ........................ 296/35.1 |

FOREIGN PATENT DOCUMENTS

| DE | 34 29 839 A1 | 4/1986 |
| DE | 37 02 619 A1 | 8/1988 |
| DE | 43 30 559 A1 | 3/1995 |
| DE | 297 22 910 U1 | 6/1999 |
| DE | 198 60 030 A1 | 6/2000 |
| DE | 10 2004 035 530 A1 | 2/2006 |
| DE | 10 2004 053 198 A1 | 5/2006 |
| EP | 0 670 257 A1 | 9/1995 |
| GB | 1 237 615 A | 6/1971 |

OTHER PUBLICATIONS

German Search Report dated Jun. 8, 2011 with partial English translation (ten (10) pages).
International Search Report dated Sep. 1, 2011 with English translation (four (4) pages).

* cited by examiner

*Primary Examiner* — Joseph Pape
(74) *Attorney, Agent, or Firm* — Crowell & Moring LLP (57) ABSTRACT

A motor vehicle has a support structure formed of a chassis frame and a vehicle body. The chassis frame and vehicle body are bolted together by four bolt locations in the area of upper supports of the spring struts of the front and rear axle. The chassis frame and vehicle body are also glued to each other along segments of the support structure thereof extending parallel to each other, wherein adhesive surfaces are located in the area between the front and rear bolt locations. The adhesive in the middle area of the motor vehicle ensures a large surface area for force application from the chassis frame into the vehicle body and vice versa, which is supplemented by the bolt locations outside of the adhesive joint.

17 Claims, 5 Drawing Sheets

MOTOR VEHICLE HAVING A CHASSIS FRAME AND A VEHICLE BODY

CROSS REFERENCE TO RELATED APPLICATIONS

This application is a continuation of PCT International Application No. PCT/EP2011/060004, filed Jun. 16, 2011, which claims priority under 35 U.S.C. §119 from German Patent Application No. 10 2010 030 295.3, filed Jun. 21, 2010, the entire disclosures of which are herein expressly incorporated by reference.

BACKGROUND AND SUMMARY OF THE INVENTION

The invention relates to a motor vehicle having a chassis frame and a vehicle body which are mutually connected by gluing and bolting.

Such a motor vehicle is known, for example, from German Patent document DE 34 29 839 A1, and has an upwardly open channel on its chassis frame, which channel is filled with adhesive before the joining of the chassis frame and the vehicle body. In the assembled condition of the chassis frame and the vehicle body, a vertical connecting flange at the lower end section of the vehicle body engages from above in the adhesive channel of the chassis frame. Bolted connections at the respective corners of the chassis frame and of the vehicle body, respectively, fix the two assemblies to one another, so that special chucking devices will not be necessary for the duration of the setting of the adhesive. In a further development of the known motor vehicle from German Patent document DE 37 02 619 A1, the chassis frame is shortened in its front area and is supplemented by a separate front end which has a front frame as well as a subframe.

It is an object of the invention to provide a motor vehicle with an improved further development of the chassis frame and the vehicle body, the chassis frame and the vehicle body being connected with one another in an advantageous fashion.

This and other objects are achieved by a motor vehicle having a chassis frame and a vehicle body, which are mutually connected by gluing and bolting. The chassis frame accommodates a front axle and a rear axle as well as at least one drive unit. Bolting locations are situated in the area of the front axle and the rear axle, and gluing is limited to the area or a partial area between the front and the rear bolting locations.

It is a central aspect of the invention to limit the gluing to the area, or to a partial area, between the front and the rear bolting locations. In this case, front and rear bolting locations are the locations of the bolt connection between the chassis frame and the vehicle body in the area of the front axle, on the one hand, and in the area of the rear axle, on the other hand. The bolting according to the invention in the area of the two axles creates connection locations situated close to the end section of the motor vehicle, which connection locations contribute significantly to the stiffness of the support structure of the motor vehicle composed of the chassis frame and the vehicle body. On the other hand, as a result of the large-surface gluing in the center area of the motor vehicle, a composite of the chassis frame and the vehicle body is created that has a high stiffness and strength, with advantages particularly during the introduction of force in the event of a collision of the motor vehicle, whereby the crash energy can be effectively reduced, also in the event of a lateral crash.

By means of the construction method according to the invention, a support structure for a motor vehicle is created, where, during the production process of the motor vehicle with the chassis frame and the vehicle body, first two separate assemblies will exist which permit a facilitated and cost-effective mounting, for example, in spatially separated production and mounting equipment. In this case, it is crucial that neither the chassis frame nor the vehicle body each by themselves have sufficient stiffness and/or strength for the driving operation of the motor vehicle and for the introduction of crash forces in the event of a collision of the vehicle, but that the fastening areas of the chassis frame and of the vehicle body are coordinated with one another and the type of fastening is chosen such that the assembled support structure of the chassis frame and the vehicle body as a whole meets the demanded stiffness and strength requirements. The support structure of the motor vehicle according to the invention achieved by the combination of the chassis frame and the vehicle body, in principle, is therefore a "self-supporting vehicle body" and not a vehicle body with a separation of functions of the chassis frame and the vehicle body.

The bolting preferably takes place above the area of the front and or rear axle, particularly preferably in that area of the chassis frame (and the corresponding area of the vehicle body) on which the wheel suspension supports itself at the chassis frame. In an advantageous embodiment of the invention, the bolting takes place at the upper mount of a spring-damper unit, in the following called "spring strut", or at the upper mount of a shock absorber or a spring unit.

In a preferred further development of the invention, the bolting locations are constructed as planar areas, so that high forces can be transmitted by way of the bolted connection. If required, the bolting at each of the preferably four bolting locations (in each case, on the right and left at the front and rear axle) takes place by several bolts respectively.

In a preferred further development of the invention, areas with elongated and mutually parallel adhesive surfaces are created for producing the adhesive connection, which results in high stability under load of the adhesive connection. By means of the distance of the corresponding adhesive surfaces from the chassis frame and the vehicle body that is defined by the carried-out bolting, a defined size of the adhesive gap is achieved. As a result of the parallel formation of the adhesive surfaces, these are insensitive to component and/or mounting tolerances.

If required, the distance of the adhesive surfaces can be changed by measures in the area of the bolting locations, for example, by inserting an intermediate layer between the bolting surfaces of the chassis frame and the vehicle body or by the removal of material at the bolting surfaces.

The adhesive gap has a height of preferably at least three millimeters. When an adhesive of medium shear strength is used, an equalization of different thermal expansions of the chassis frame and the vehicle body can therefore take place as a result of the relatively large thickness of the adhesive bead in the adhesive connection.

The adhesive preferably is a single-component adhesive with a sufficiently long "open window" after the application of the adhesive and a comparatively faster hardening after the joining of the chassis frame and the vehicle body. The hardening can be accelerated by admixing a "booster". In addition, by means of the "booster", a hardening is achieved that is uniform along the entire cross-section of the adhesive bead and is independent of the moisture of the environment. By way of the bolting, which took place before the joining of the two adhesion partners, independently of the final hardening of the adhesive, the motor vehicle can be moved along in the production sequence and can continue to be assembled so that, in addition to contributing to the stiffness and strength of the support structure of the motor vehicle, the bolting also reduces the cycle times during the assembling since waiting time for the hardening of the adhesive is eliminated.

In a further development of the invention, the chassis frame has a right and a left side member as supporting elements in the central area, which side members can be further supplemented by a front and a rear cross member to form a rectangular supporting frame. The adhesive can advantageously be applied to the top sides of the side members and/or cross member or of the supporting frame.

If the members are present and arranged such that they form the above-described rectangular supporting frame, a very stiff supporting frame will be present which permits a surroundingly ring-shaped adhesive connection in the center area of the motor vehicle.

In a further development of the invention, the space within the rectangular supporting frame can be used for accommodating an energy accumulator, particularly an electric battery, for example, in lithium-ion technology. The composite consisting of the supporting frame at the chassis frame and of the corresponding support structure at the vehicle body is particularly stiff and capable of reducing high energies, for example, in the event of a side crash of the motor vehicle in a targeted manner and thereby protecting the energy accumulator from accident-caused damage.

In a further development of the invention, as a result of the height offset between the adhesive connection, on the one hand (along the side members and/or cross members of the supporting frame) and the bolting locations arranged in the area of the axles, preferably in the area above the axles, on the other hand, a high stiffness of the support structure of the motor vehicle is achieved in comparison to those force introductions which exercise moments on the support structure of the motor vehicle according to the invention.

In a still further development of the invention, the vehicle body is a formation closed on its underside by a floor and capable of transmitting forces introduced in the transverse direction of the motor vehicle at the level of the floor to the opposite side. In addition, the vehicle body can therefore be equipped during the production process independently of the chassis frame with interior fitting components, such as coverings of the floor, of the interior vehicle walls and of the interior of the roof, as well as with seats, a center console, instrument cluster, operating elements, etc.

In a preferred further development of the invention, the chassis frame consists of a metallic material, preferably of a light-metal material, such as an aluminum alloy. In this case, the individual components of the chassis frame can be mutually connected, for example, by welding, gluing, riveting, bolting or any other suitable joining method. The components may be made of sheet metal, extruded profiles and/or cast parts.

The vehicle body is preferably composed of components, particularly shell-shaped components, made of a plastic material. Carbon-fiber-reinforced plastics are particularly suitable for this purpose. The connection of the individual components of the vehicle body preferably takes place by gluing, for example, by use of a two-component adhesive.

For reducing the energy requirements during the manufacturing of the motor vehicle, according to a further aspect of the invention, a KTL coating and/or the application of a conventional paint coating will no longer be needed in the case of a metallic chassis frame. For achieving reproducibly loadable adhesive connections, the adhesive surfaces of the chassis frame are treated before the gluing-together, for example, cleaned by chemical methods, rendered passive, subjected to a plasma treatment, provided with a Pyrosil coating, etc. The cleaning and preparation measures mentioned in the context of the present invention are not included in the term "surface coating".

All direction and position data in connection with components of the motor vehicle according to the invention relate in each case to the support structure of the motor vehicle composed of the chassis frame and the vehicle body and to the driving direction of the motor vehicle when driving forward.

For producing a motor vehicle according to the invention, the following production sequence is provided by way of example:

(a) producing the chassis frame of components made of an aluminum material by welding, gluing, riveting and/or bolting, in which case the components may be cast parts, extruded profiles, and/or sheet metal parts;

(b) producing the vehicle body of components made of a carbon-fiber-reinforced plastic material, preferably by gluing, in which case reinforcements made of a metallic material may be partially integrated;

(c) equipping the chassis frame with elements of the front as well as rear wheel suspension and with at least one drive unit, transmission, and/or with further components of the drive train;

(d) equipping the vehicle body with attachment parts and/or fixtures;

(e) cleaning the adhesive surfaces, particularly at the chassis frame;

(f) applying the adhesive to the adhesive surfaces, preferably to the adhesive surfaces of the chassis frame;

(g) placing the vehicle body onto the chassis frame (or vice-versa);

(h) bolting the vehicle body to the chassis frame at the bolting locations in the area above the front and the rear axle, preferably in the area of the upper mounts of the spring struts or the like;

(i) as a result of the bolted connection, a defined adhesive gap will automatically occur between the chassis frame and the vehicle body; and (j) setting of the adhesive, in which case, because of the bolting before the conclusion of the setting, a sufficiently loadable connection of the chassis frame and the vehicle body will already exist, so that the motor vehicle will be available for further mounting volumes, surface treatments, etc. or can be conveyed for the further production sequence and/or can be driven under its own power.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
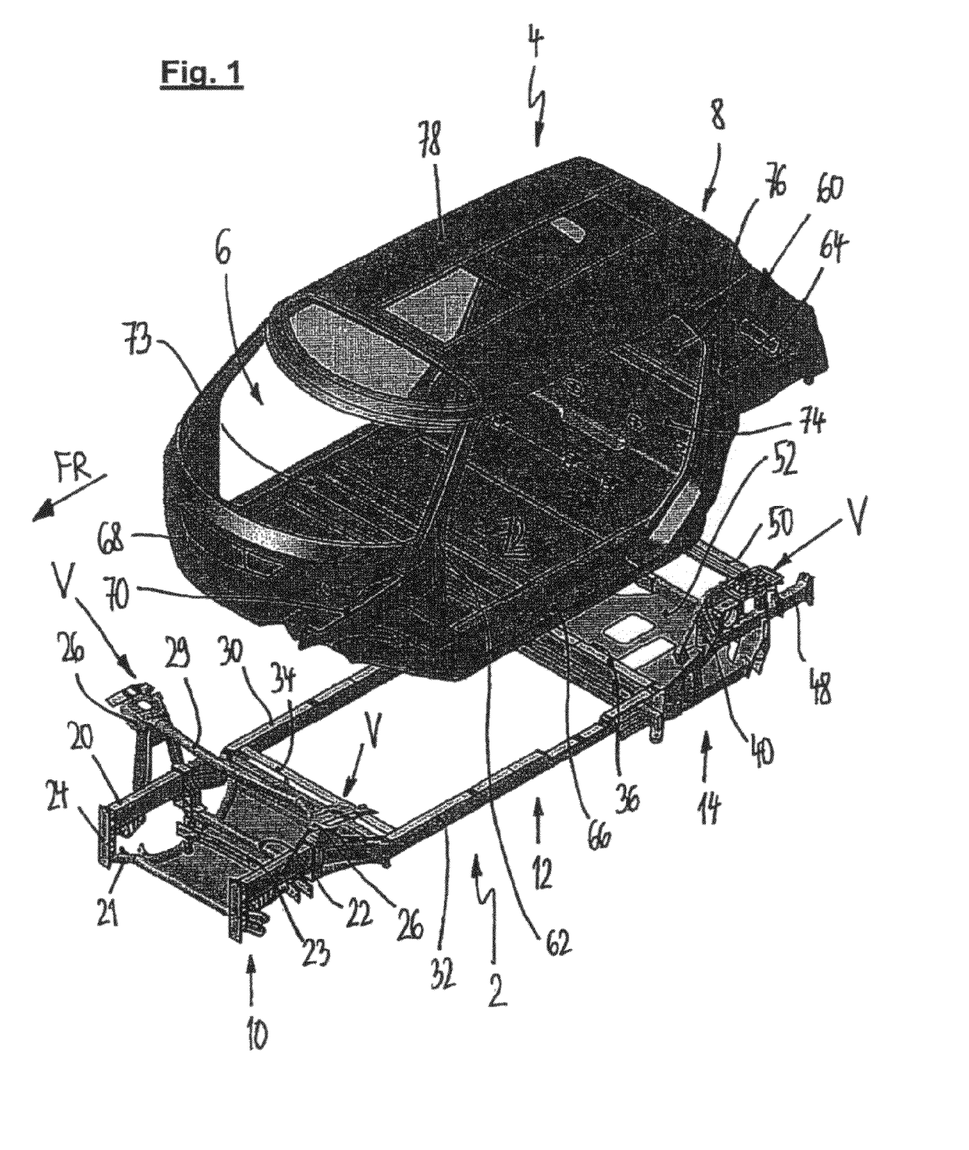
FIG. 1 is a schematic perspective view of the support structure of a motor vehicle according to an embodiment of the invention, before the connection of the chassis frame and the vehicle body.
Figure 3:
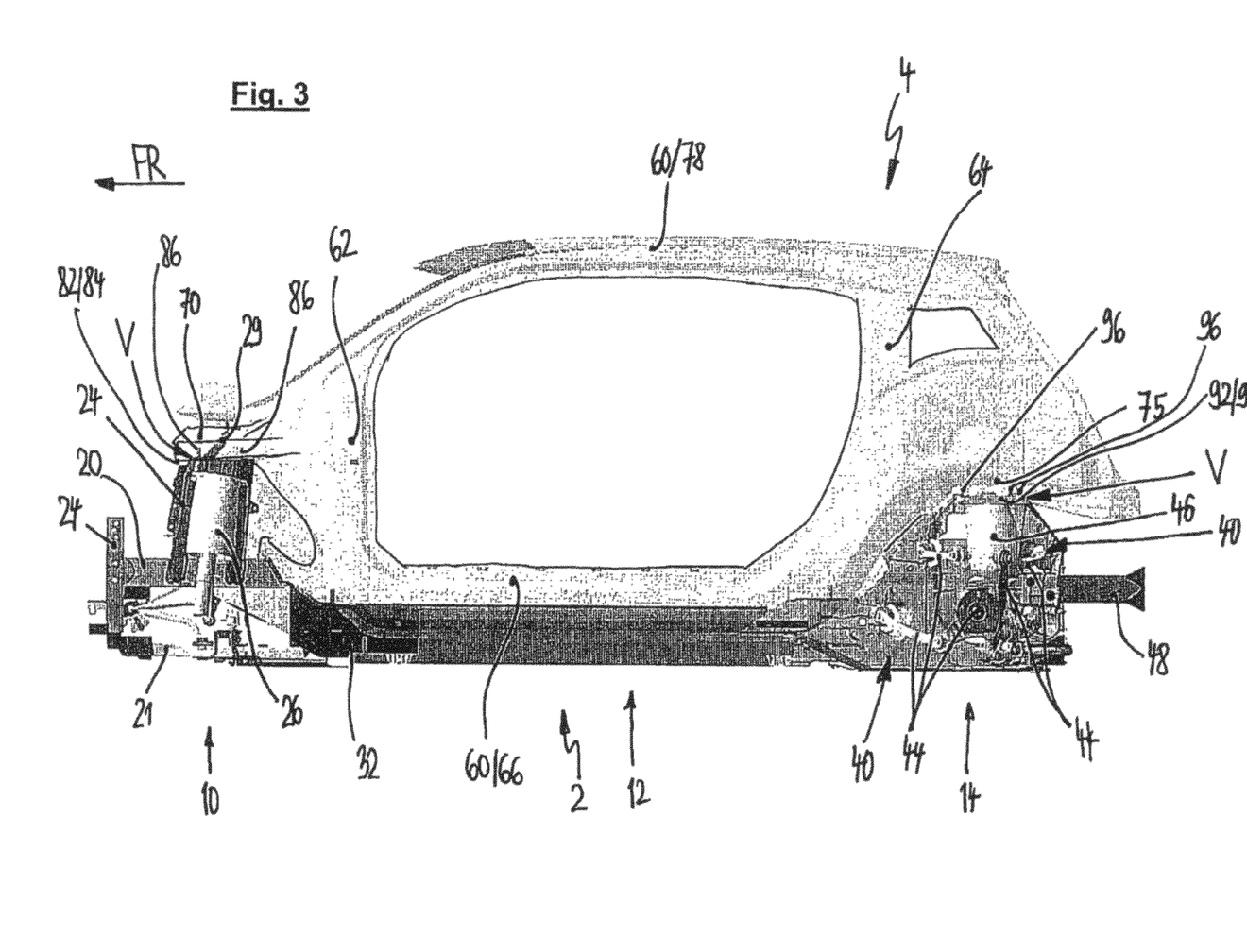
FIG. 3 is a lateral view of the support structure of the motor vehicle of FIG. 1 in the assembled condition.

FIG. 1 illustrates the support structure of a motor vehicle according to an embodiment of the invention before the connection of the two assemblies—the chassis frame 2 and the vehicle body 4. FIG. 3 illustrates the two assemblies in the assembled condition.

The chassis frame 2 is composed of a plurality of individual components made of a metallic material. The individual components are preferably produced of light-metal alloys, for example, of aluminum alloys.

Relative to the driving direction FR of the motor vehicle, the chassis frame 2 has a front section 10, a center section 12 and a rear section 14. Sections 10 to 14 are constructed to be essentially symmetrical with respect to the longitudinal center plane of the motor vehicle.

The front section 10 is composed mainly of front upper and lower side members 20 and 21, cross members 22 and 23, bumper consoles 24, spring strut mounts 26 as well as several connection and sheet steel corner plates. The components 20 to 24 are formed of extruded profiles made of aluminum. The spring strut mounts 26 are diecast components made of aluminum. The remaining components are produced of metal sheets or of extruded profiles made of aluminum. The front section 10 accommodates the components of a front axle (not shown) including the front spring struts 28 (see FIG. 3). The remaining clearance in the front section 10 is used as a luggage compartment in the completely assembled motor vehicle.

The center section 12 of the chassis frame 2 is essentially a rectangular frame consisting of a right and a left lateral side member 30 and 32, respectively, as well as a front and a rear cross member 34 and 36, respectively, which connect the front and rear ends respectively of the lateral side members 30 and 32. The members 30 to 36 are formed of extruded profiles made of aluminum. The top sides of the members 30 to 36 extend at least approximately in a plane, which is oriented approximately horizontally. In the area of the front and the rear ends of the side members 30 and 32, consoles 38 and 39 (see also especially FIG. 2) are additionally provided. The rectangle formed by the members 30 to 36 is vacant on the interior side. An energy accumulator, preferably an electric energy accumulator, is arranged in this clearance in the completely assembled motor vehicle. However, as an alternative or in addition, a tank for gasoline or diesel fuel, natural gas or hydrogen may be provided in this space.

The rear section 14 of the chassis frame 2 is formed mainly by lateral integral components 40 made of diecast aluminum. These complexly shaped and large-volume integral components 40 have a plurality of reinforcing ribs 42 (see FIG. 2). Components 44 of a rear axle, including the rear spring struts 46, are arranged at the integral components 40. A drive unit, which is not shown, together with a transmission, is accommodated between the two integral components 40. The drive unit preferably is an electric motor, if required, supplemented by a small-volume internal-combustion engine for increasing the range of the vehicle. The drive unit may naturally also be an internal-combustion engine, possibly with an electric motor (hybrid drive). Rear side members 48, which are formed by extruded aluminum profiles, are connected on the backside to the integral components 40. The rear section 14 is supplemented by plane sheet metal components 50 and 52 made of aluminum.

As an alternative, the drive unit may also be arranged in the front section 10 of the chassis frame 2. Naturally, both sections 10 and 14 may also have a drive unit or several drive units.

The vehicle body 4 forms the passenger compartment 6 as well as a rear luggage compartment 8. The vehicle body 4 has the following components, among others: Side frame 60 with A-pillars 62, C-pillars 64 and lateral side members 66, an end face wall 68, front supporting members 70, a floor 72 constructed as a reinforcing shear panel, a rear end wall 74, rear supporting members 75, a rear window shelf 76 and a roof 78. The above-mentioned components are made of a plastic material, preferably of a carbon-fiber-reinforced plastic material and are mutually connected, for example, by gluing by use of a two-component adhesive. The floor 72 is reinforced, for example, by at least one seat cross member 73 made of a metallic material, such as an extruded aluminum profile. The seat cross member 73 is placed on the floor 72 or integrated in the floor 72.

The motor vehicle is completed by panels (preferably of a plastic material), which are not shown. These panels, like the components of the vehicle body 4 that are directly visible as the skin of the motor vehicle, are preferably not painted but are covered by film.

The chassis frame 2 and the vehicle body 4 are fitted on separate assembly lines and are only subsequently combined as preassembled constructional units. For example, the elements of the front and rear axle as well as the drive unit are inserted into the chassis frame 2. The vehicle body 4 is, for example, equipped with essential components of the inside lining and/or the interior fittings.

The chassis frame 2 and the vehicle body 4 are mutually joined by bolting, on the one hand, and by gluing, on the other hand.

The bolting takes place at four bolting locations V, each in the area of the upper support of the spring struts 28 and 46. For this purpose, the respective areas of the upper supports of the spring struts 28 and 46 at the spring strut mounts 26 of the front section 10 of the chassis frame 2 as well as at the integral components 40 of the rear section 14 are shown in an enlarged fashion, as will be described in detail in the following.

Figure 2:
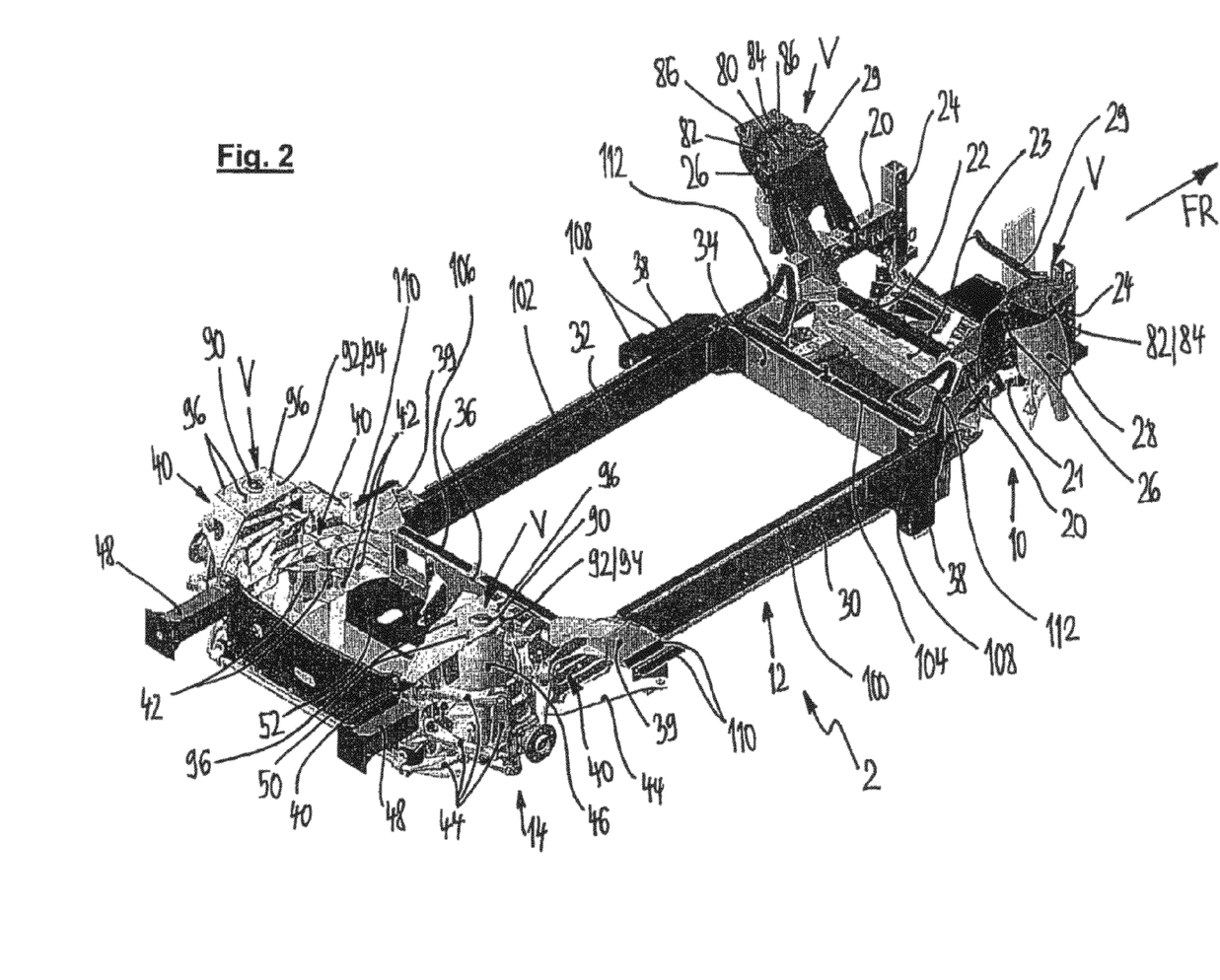
FIG. 2 is a perspective view of the chassis frame of the motor vehicle of FIG. 1, with the applied adhesive bead.
Figure 4:
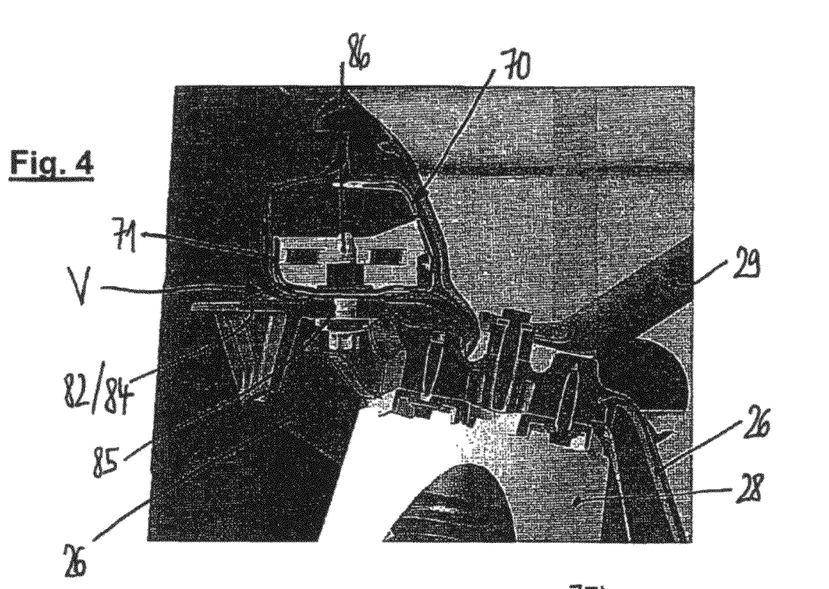
FIG. 4 is a sectional view of a front bolting location.

The bolting locations V at the front section 10 of the chassis frame 2 are illustrated in FIG. 4 on the example of the left bolting location V as a sectional view. The section extends through the connection of a so-called strut brace 29 which mutually connects the two spring strut mounts 26. FIG. 2 also very clearly shows the bolting locations V. At the spring strut mounts 26, the mounts for the upper ends of the spring struts 28 have the reference number 80. The approximately horizontally extending top sides 82 of the spring strut mounts 26 are widened toward the outside and, in the thereby created exterior fastening area 84, have passage openings 85 for two bolts 86 (see also FIG. 3). As illustrated in FIG. 4, the supporting member 70 is produced as a sheet metal shell construction and has an interior reinforcing metal sheet 71.

Figure 5:
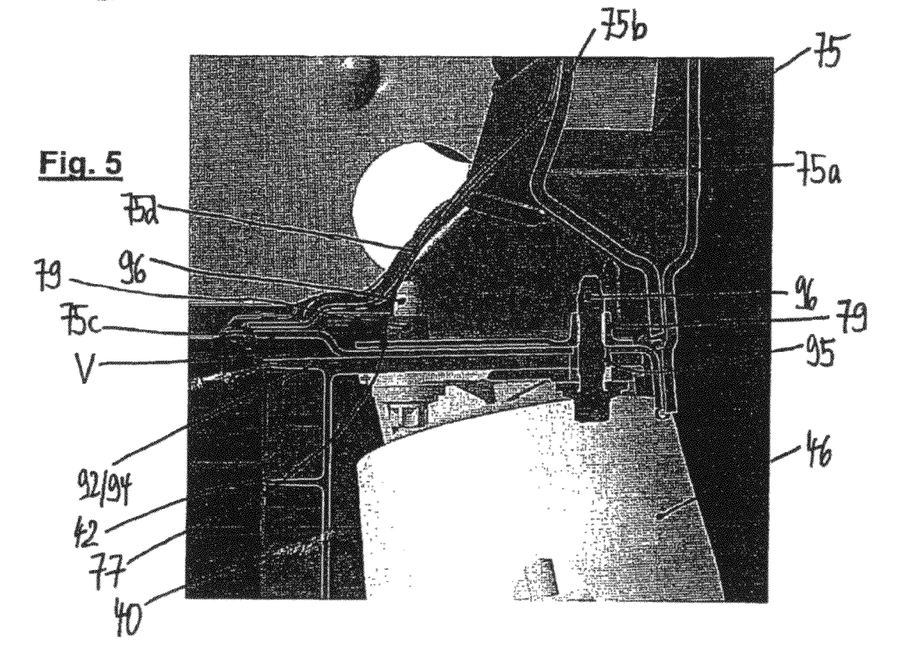
FIG. 5 is a sectional view of a rear bolting location.

The bolting locations V at the rear section 14 of the chassis frame 2 are illustrated in FIG. 5 on the example of the right bolting location V in a sectional view. The section extends through the rear fastening bolt of the two exterior fastening bolts 96. The arrangement of the fastening bolts 96 is very clearly illustrated in FIG. 2. At the horizontally extending top sides 92 of the integral components 40 in FIG. 2, the mounts 90 for the spring struts 46 are visible. The approximately horizontally extending top sides 92 of the integral components 40 are constructed in an enlarged fashion and have the passage openings 95 for the above-mentioned three bolts 96 in the thereby created fastening area 94. The sectional representation of FIG. 5 shows the design of the support structure of the vehicle body 4 in the area of the rear supporting member 75, which is composed of mutually glued-together shell components 75a, 75b, 75c and 75d made of a carbon-fiber-reinforced plastic material and is reinforced on the interior side by a metallic insert 77 with internal threads 79 for the three bolts 96.

The fastening areas 84 and 94 of the chassis frame 2 are essentially horizontally oriented and have a planar construction. This provides contact areas for the correspondingly constructed fastening areas of the vehicle body 4.

As illustrated in FIGS. 4 and 5, the above-mentioned corresponding fastening areas of the vehicle body 4 are on the underside of the front supporting members 70 and on the underside of the rear supporting members 75, respectively. These corresponding fastening areas are also essentially horizontally oriented and have a planar construction. Thus, the chassis frame 2 and the vehicle body 4 rest on one another in a full-surface manner at the four described bolting locations V. As a result, a bolted connection with a high carrying capacity and the transmission of high forces in all directions in space become possible.

No adhesive is inserted between the fastening surfaces at the bolting locations V.

The gluing takes place in a large-surface fashion between the center section 12 of the chassis frame 2 and the corresponding surfaces of the vehicle body 4, as illustrated in detail in FIG. 2. For this purpose, adhesive beads 100 to 106 are applied in the center to the horizontally extending top sides of the lateral side members 30 and 32 as well as of the cross members 34 and 36. Thus, a rectangular adhesive length, that is closed in a ring-type fashion, is produced in an essentially horizontal plane at the chassis frame 2. Adhesive beads 108 and 110 are also placed on the front and the rear consoles 38 and 39. In addition, the adhesive bead 104 at the front cross member 34 is widened by adhesive beads 112 which extend diagonally upward toward the front and into the area of the rear end section of the upper front side member 20.

Naturally, at least one additional adhesive bead may also be provided following the adhesive bead 106 or as a direct continuation of the adhesive bead 106, which additional adhesive bead extends diagonally upward toward the rear and thereby widens the adhesive connection into the area of the rear section 14 of the chassis frame 2. However, this is not so in the case of the present embodiment because of the fissured surface of the integral components 40. In addition, greater demands would have to be made on the adhesive in this area because of the increased operating temperatures as a result of the drive unit in the rear.

At the vehicle body 4, adhesive surfaces are formed which correspond with the adhesive surfaces at the chassis frame 2, as described in detail in the following.

On the underside of the lateral side members 66 of the vehicle body 4, adhesive surfaces for the adhesive beads 100 and 102 are provided, preferably slightly offset inward toward the vehicle center, which adhesive surfaces extend parallel to the top sides of the lateral side members 30 and 32 of the chassis frame 2. Furthermore, the vehicle body 4 also has adhesive surfaces in these areas which correspond with the consoles 38 and 39 and are assigned to the adhesive beads 108 and 110. Likewise, adhesive surfaces are provided which extend on the underside of the vehicle body 4 in the front and rear transversely to the driving direction FR and are assigned to the adhesive beads 104 and 106 respectively. Corresponding adhesive surfaces for the widened adhesive beads 112 are also provided in the area of the end face wall 68 of the vehicle body 4.

All adhesive connections between the chassis frame 2 and the vehicle body 4 and all components of the chassis frame 2 and the vehicle body 4 participating in the adhesive connection have such a stiff construction that high forces can be introduced from the chassis frame 2 into the vehicle body 4 and vice-versa. For transmitting the introduced forces, the components and areas adjoining the adhesive surfaces also have a sufficiently stiff construction. On the one hand, the introduced forces are those arising in the normal driving operation of the motor vehicle. However, in particular, the introduced forces include crash forces.

Figure 6A:
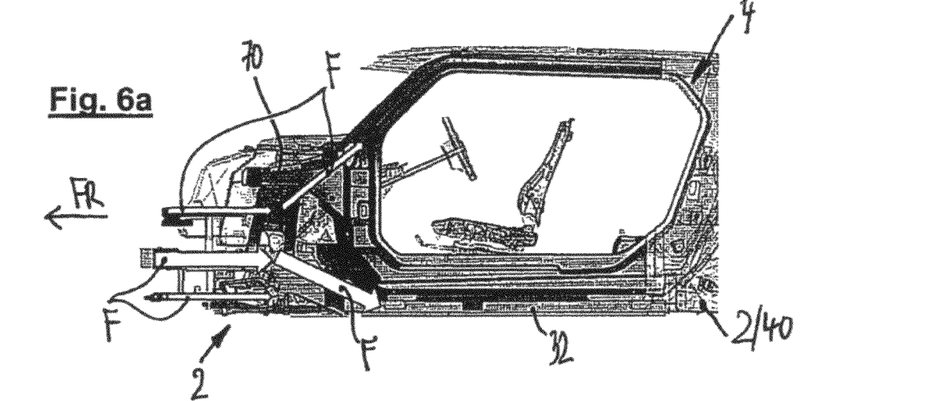
FIGS. 6a to 6c are schematic views of the path of the force within the support structure of the motor vehicle according to the invention in different load events.
Figure 6B:
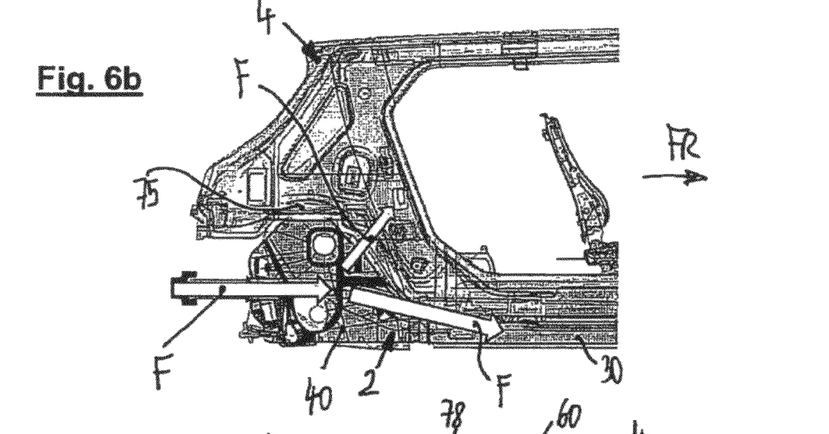
Figure 6C:
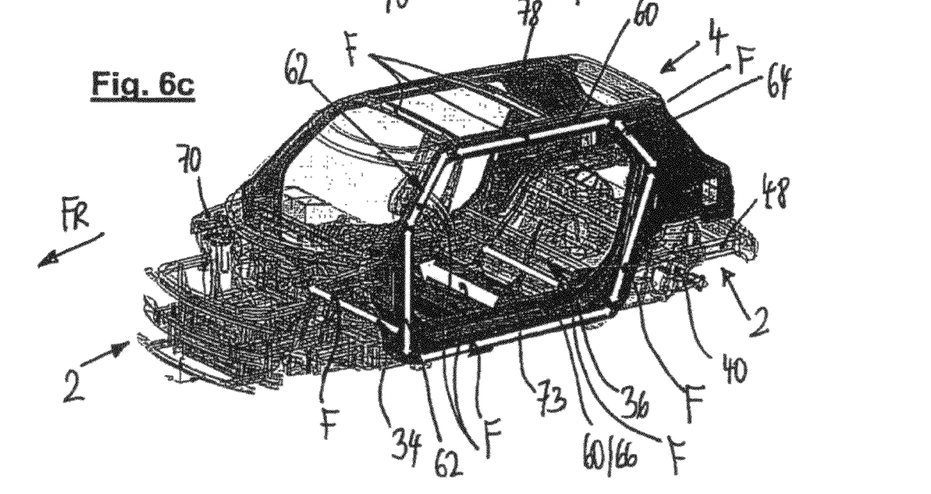

As illustrated in FIGS. 6a and 6b, the composite of the chassis frame 2 and the vehicle body 4 according to the embodiment of the invention virtually provides a self-supporting vehicle body for a motor vehicle, where crash forces, which are introduced into the chassis frame 2 in the event of a front or rear collision, are transmitted into the vehicle body 4, so that the entire support structure of the motor vehicle is utilized for reducing the collision energy. The load paths are marked by arrows F. Also, in the event of a lateral collision according to FIG. 6c, an introduction of force occurs into the vehicle body 4 as well as into the chassis frame 2, and there, particularly into the two cross members 34 and 36. In this case, the floor 72 of the vehicle body 4, particularly the seat cross member 73 integrated into the floor, has a crucial influence on the crash stiffness. As a result of the laterally stiff vehicle body 4, the collision forces can also be supported on the side of the support structure of the motor vehicle that faces away from the collision. The side frame 60 with the A-pillar 62, the side bow of the roof 78, the C-pillar 64 and the side members 66 in this case form a stiff ring composite, which absorbs the crash forces over a large surface area and, also in the vertically offset plane of the roof 78, causes a force transmission to the side of the vehicle body 4 facing away from the collision.

The decisive advantage resulting from a large-surface adhesive connection in comparison to a plurality of individual bolted or riveted connections is the uniform introduction of force by the large adhesive surface. The components of the support structure which are, for example, in the flux of force in the event of a crash, are weight-optimized components with a comparatively small wall thickness, which, however, are easily capable of absorbing and transmitting the occurring forces by way of the large adhesive surfaces. In contrast, in the case of an equivalent construction as a plurality of bolted and riveted connections, additional reinforcing measures would be required at each individual bolt or at each individual rivet.

Immediately before the joining of the preassembled constructional units of the chassis frame 2 and the vehicle body 4, the adhesive beads 100 to 112 are applied to the adhesive surfaces of the chassis frame 2. Here, the adhesive beads 100 to 112, in their cross-section, have, for example, the shape of an equilateral trapeze, the bottom base side of the trapeze by which the adhesive bead 100 to 112 rests on the top side of the components of the chassis frame, being larger than the top base side. As an alternative, the adhesive bead 100 to 112 may also have a triangular cross-section. The height of the adhesive bead 100 to 112 is greater than the adhesive gap which occurs when the chassis frame 2 and the vehicle body 4 are bolted together. The viscosity of the adhesive is proportioned such that the shape of the adhesive bead 100 to 112 is essentially maintained after its application to the chassis frame 2.

With the bolted connection of the chassis frame 2 and the vehicle body 4 at the four bolting locations V, the adhesive beads 100 to 112 are compressed to a defined measurement by the thereby occurring bringing-together of the corresponding adhesive surfaces of the chassis frame 2 and the vehicle body 4. The adhesive gap is proportioned such that also when the maximally permissible production tolerances of the chassis frame 2 and the vehicle body 4 are added, a minimum measurement is ensured for the adhesive gap.

Since particularly the adhesive beads 100 and 102 have a considerable length, the minimum measurement for the adhesive thickness depends on the length compensation, which has to take place in the case of different materials of the chassis frame 2 and the vehicle body 4 and correspondingly different thermal expansions of the chassis frame 2 and the vehicle body 4 in the adhesive beads 100 and 102. On the other hand, the thickness of the adhesive beads 100 and 102 (and naturally also of the remaining adhesive beads 104 to 112) is limited in the upward direction because the stiffness of the adhesive connection decreases as the thickness increases.

For the adhesive connections between the chassis frame 2 and the vehicle body 4, for example, an adhesive of an average shear stiffness is suggested, which, at −30° C., has a shear stiffness of approximately 70 MPa and, at +70° C., has a shear stiffness of approximately 15 MPa, and therefore has a comparatively slight temperature-caused drop of the shear stiffness.

These shear stiffness features ensure that the crash demands are met in the entire operating temperature range of the motor vehicle from approximately −30° C. to +80° C. In this case, it is particularly important that, in the event of a lateral crash, for example, a lateral crash with a pole, the chassis frame and the vehicle body will, from the start, simultaneously and uniformly reduce the collision energy.

In the case of the suggested shear stiffness, the thickness of the adhesive beads 100 to 112 amounts to, for example, at least 3 mm, preferably at least 4 mm. Based on production tolerances of, for example, +/−1 mm for the chassis frame 2 and +/−2 mm for the vehicle body 2 (4?), the thickness of the adhesive bead therefore amounts to 7+/−3 mm in order to ensure the suggested preferred minimum thickness of the adhesive bead of 4 mm in every case. In this case, the quantity of the applied adhesive is, for example, proportioned such that, in the case of a thickness of the adhesive bead of 4 mm, a width of the adhesive surface of 50 mm is obtained. When the tolerance range is exhausted in the upward direction (thickness of the adhesive bead of 10 mm), a width of the adhesive surface of 20 mm is obtained.

By limiting the gluing to the area or to a partial area between the front and the rear bolting locations V, the temperature-caused length compensation which the adhesive beads 100 and 102 have to overcome is reduced.

As mentioned above, the chassis frame 2 preferably consists of an aluminum material. For reducing the energy expenditure during the vehicle production, a KTL coating and a conventional paintwork or the like can be dispensed with. In this case, at least one chemical cleaning of the surface of the chassis frame 2 is required before the application of the adhesive in order to eliminate an oxidation layer on the surface of the aluminum that impairs the characteristic features of the adhesive connection. This cleaning takes place immediately before the application of the adhesive, suitable measures possibly having to be taken on the conveying path from the cleaning station to the location of the adhesive application in order to prevent an interim oxidation of the surface of the aluminum.

In the case of a motor vehicle according to the invention, the vehicle body 4, which defines the outer appearance, can be newly designed for a follow-up model of the motor vehicle, whereas the chassis frame 2 for the follow-up model, which does not become directly visible to the vehicle user, need only be adapted thereto. The use of the chassis frame 2 for more than one model cycle of a motor vehicle results in a considerable cost saving potential.

In summary, the support structure of a motor vehicle is composed of a chassis frame 2 and a vehicle body 4. The chassis frame 2 accommodates elements of the front and the rear wheel suspension, as well as at least one drive unit. The chassis frame 2 and the vehicle body are, on the one hand, bolted to one another by way of four bolting locations V in the area of the upper supports of the spring struts 28 and 46 of the front and rear axle. On the other hand, the chassis frame 2 and the vehicle body 4 are glued to one another along mutually parallel extending sections of their support structures, the adhesive surfaces being situated in the area between the front and rear bolting locations V. In this case, it is critical that, as a result of the gluing in the center area of the motor vehicle, a large-surface introduction of force is ensured from the chassis frame 2 into the vehicle body 4 and vice-versa. This large-surface introduction of force is supplemented by the above-mentioned bolting locations V situated outside the glued connection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a chassis frame; and
   a vehicle body; wherein
   the chassis frame includes attachment points for a front axle and a rear axle as well as at least one drive unit;
   the chassis frame and the vehicle body have corresponding front and rear bolting locations that are located in an area of the front axle and the rear axle; and
   the chassis frame and the vehicle body have gluing locations upon which an adhesive is applied, the gluing locations being limited to an area between the front and rear bolting locations.

2. The motor vehicle according to claim 1, wherein the bolting locations are located above at least one of the front axle and the rear axle.

3. The motor vehicle according to claim 1, wherein the bolting locations are configured as approximately mutually parallel extending surfaces on the chassis frame and the vehicle body.

4. The motor vehicle according to claim 2, wherein the bolting locations are configured as approximately mutually parallel extending surfaces on the chassis frame and the vehicle body.

5. The motor vehicle according claim 1, further comprising:
   a support for a suspension component, wherein the bolting locations are located on the support.

6. The motor vehicle according claim 1, wherein adhesive surfaces for gluing are constructed as approximately mutually parallel extending surfaces on the chassis frame and the vehicle body which, in a bolted-together condition of the chassis frame and the vehicle body, extend at a defined distance with respect to one another.

7. The motor vehicle according claim 6, wherein the defined distance between the adhesive surfaces on the chassis frame and the vehicle body, in the bolted-together condition of the chassis frame and the vehicle body, is approximately three millimeters.

8. The motor vehicle according to claim 1, further comprising an adhesive for the gluing locations, the adhesive being a single-component adhesive.

9. The motor vehicle according claim 1, wherein the chassis frame comprises a central section having two lateral side members on an exterior vehicle side.

10. The motor vehicle according claim 9, wherein ends of the two lateral side members are mutually connected by a front cross-member and a rear cross-member, respectively, the two lateral side members and the front and rear cross-members essentially extending in a plane.

11. The motor vehicle according to claim 10, wherein top sides of at least one of the lateral side members and cross-members are configured as adhesive surfaces.

12. The motor vehicle according to claim 11, wherein top sides of at least one of the lateral side members and the cross-members are arranged at a location lower than the bolting locations.

13. The motor vehicle according to claim 1, wherein the vehicle body is a passenger compartment having a floor.

14. The motor vehicle according to claim 1, wherein the chassis frame is made at least predominantly of a metallic material, and the vehicle body is made at least predominantly of a plastic material.

15. The motor vehicle according to claim 14, wherein the chassis frame is made at least predominantly of an aluminum material, the aluminum material being free of any surface coating on adhesive surfaces thereof.

16. The motor vehicle according to claim 1, wherein the gluing locations define a gluing area and the gluing area is devoid of any of the bolting locations.

17. A motor vehicle, comprising:
a chassis frame that is operatively configured to accommodate a front axle and a rear axle as well as at least one drive unit;
a vehicle body;
front and rear bolting locations that are configured to mutually connect the chassis frame and the vehicle body and that are located in an area of the front axle and the rear axle, respectively; and
gluing locations upon which an adhesive is disposed and which join the chassis frame and the vehicle body together, the gluing locations being limited to an area between the front and rear bolting locations, wherein the bolting locations are located above at least one of the front axle and the rear axle.

* * * * *